(12) United States Patent
Jang

(10) Patent No.: US 11,148,163 B2
(45) Date of Patent: Oct. 19, 2021

(54) SYSTEM AND METHOD FOR CONTROLLING AIR CONDITIONER

(71) Applicants: Hyundai Motor Company, Seoul (KR); Kia Motors Corporation, Seoul (KR)

(72) Inventor: Kyung Mo Jang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 126 days.

(21) Appl. No.: 16/572,125

(22) Filed: Sep. 16, 2019

(65) Prior Publication Data

US 2020/0346238 A1 Nov. 5, 2020

(30) Foreign Application Priority Data

May 2, 2019 (KR) .......................... 10-2019-0051382

(51) Int. Cl.
  *B05B 16/60* (2018.01)
  *F24F 3/14* (2006.01)
  (Continued)

(52) U.S. Cl.
  CPC ............... *B05B 16/60* (2018.02); *F24F 3/14* (2013.01); *F24F 11/30* (2018.01); *F24F 11/61* (2018.01);
  (Continued)

(58) Field of Classification Search
  CPC ... B05B 16/60; F24F 3/14; F24F 11/80; F24F 11/30; F24F 11/64; F24F 11/61;
  (Continued)

(56) References Cited

U.S. PATENT DOCUMENTS 5,347,463 A * 9/1994 Nakamura ........... B23Q 7/1426
  700/226
2007/0093193 A1* 4/2007 Cook ...................... B05B 16/60
  454/52

(Continued)

FOREIGN PATENT DOCUMENTS

JP 4703736 B2 * 6/2011 ............. G06Q 30/02

OTHER PUBLICATIONS

Yasuhiro, Energy management system and method, 2010, google patents, pp. 3-4 (Year: 2010).*

*Primary Examiner* — Rocio Del Mar Perez-Velez
*Assistant Examiner* — Yvonne Trang Follansbee
(74) *Attorney, Agent, or Firm* — Mintz Levin Cohn Ferris Glovsky and Popeo, P.C.; Peter F. Corless

(57) ABSTRACT

A system includes is provided to include an air conditioner in each zone of a painting process line supplying heated air according to temperature/humidity stabilization conditions for a painting process of each zone of a spray booth. A controller transmits operation information of the air conditioner including temperatures and humidities of outdoor air flowing into the air conditioner and indoor air inside each zone of the booth and temperature/humidity stabilization condition values for each zone of the booth. A server extracts stabilization time of the operation information equal to current operation information in a database in which the stabilization time required for temperature and humidity of each both zone to reach the condition values is stored and applies operation command for the air conditioner to the controller at operation schedule time derived by calculating the stabilization time backward from a time when a vehicle arrives at each booth zone.

18 Claims, 9 Drawing Sheets

(51) Int. Cl.
  *F24F 11/30* (2018.01)
  *F24F 11/64* (2018.01)
  *F24F 11/61* (2018.01)
  *G05B 13/02* (2006.01)
  *F24F 11/80* (2018.01)
  *F24F 110/10* (2018.01)
  *F24F 110/12* (2018.01)
  *F24F 110/20* (2018.01)
  *F24F 110/22* (2018.01)

(52) U.S. Cl.
  CPC .............. *F24F 11/64* (2018.01); *F24F 11/80* (2018.01); *G05B 13/026* (2013.01); *F24F 2110/10* (2018.01); *F24F 2110/12* (2018.01); *F24F 2110/20* (2018.01); *F24F 2110/22* (2018.01); *F24F 2221/00* (2013.01)

(58) Field of Classification Search
  CPC ............... F24F 2110/10; F24F 2110/12; F24F 2110/20; F24F 2110/22; G05B 13/026
  See application file for complete search history.

(56) References Cited

U.S. PATENT DOCUMENTS

| | | | |
|---|---|---|---|
| 2013/0171920 A1* | 7/2013 | Bhattacharya | B05B 12/08 454/52 |
| 2013/0297078 A1* | 11/2013 | Kolavennu | G05D 23/1917 700/276 |
| 2014/0277762 A1* | 9/2014 | Drew | G05D 23/1904 700/276 |
| 2016/0377305 A1* | 12/2016 | Kwa | F24F 11/30 700/277 |
| 2018/0172302 A1* | 6/2018 | Jang | F24F 11/30 |

* cited by examiner

<Temperature control>

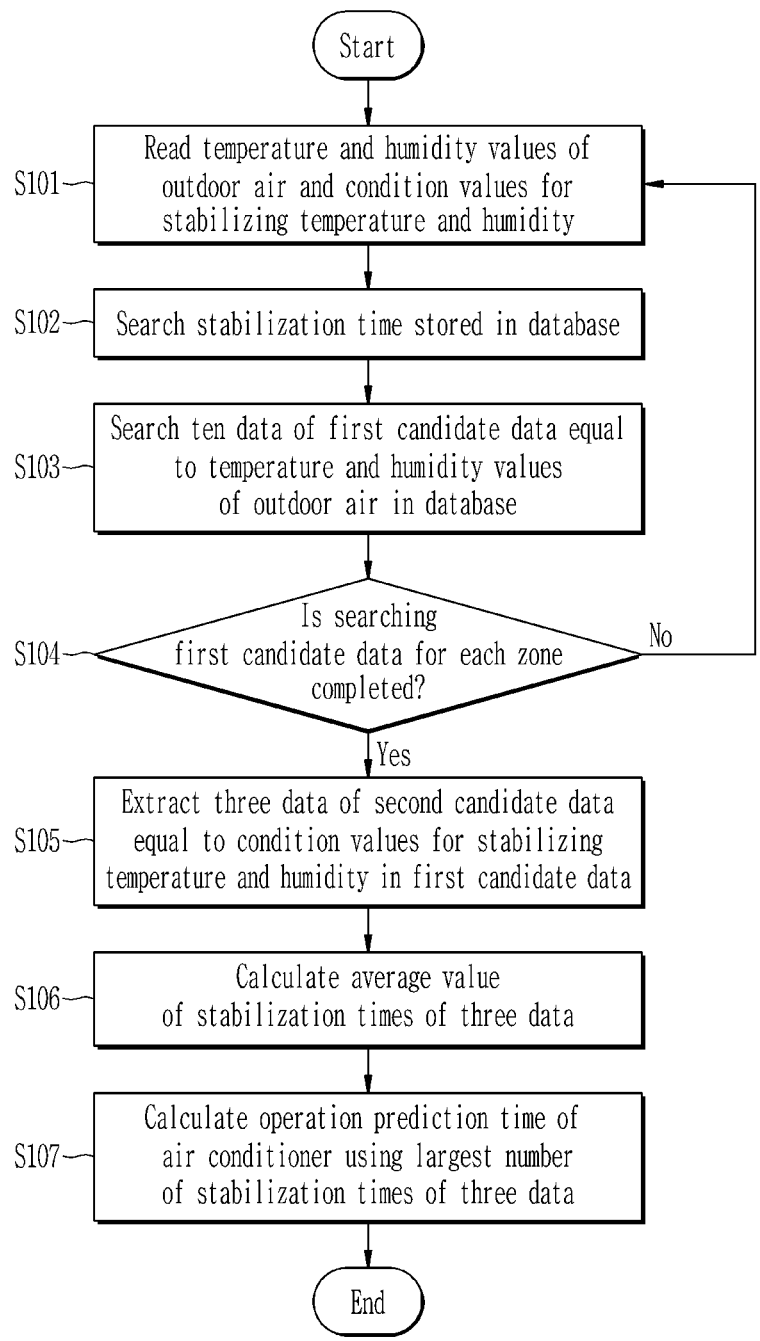

<Temperature control>

<Humidity control>

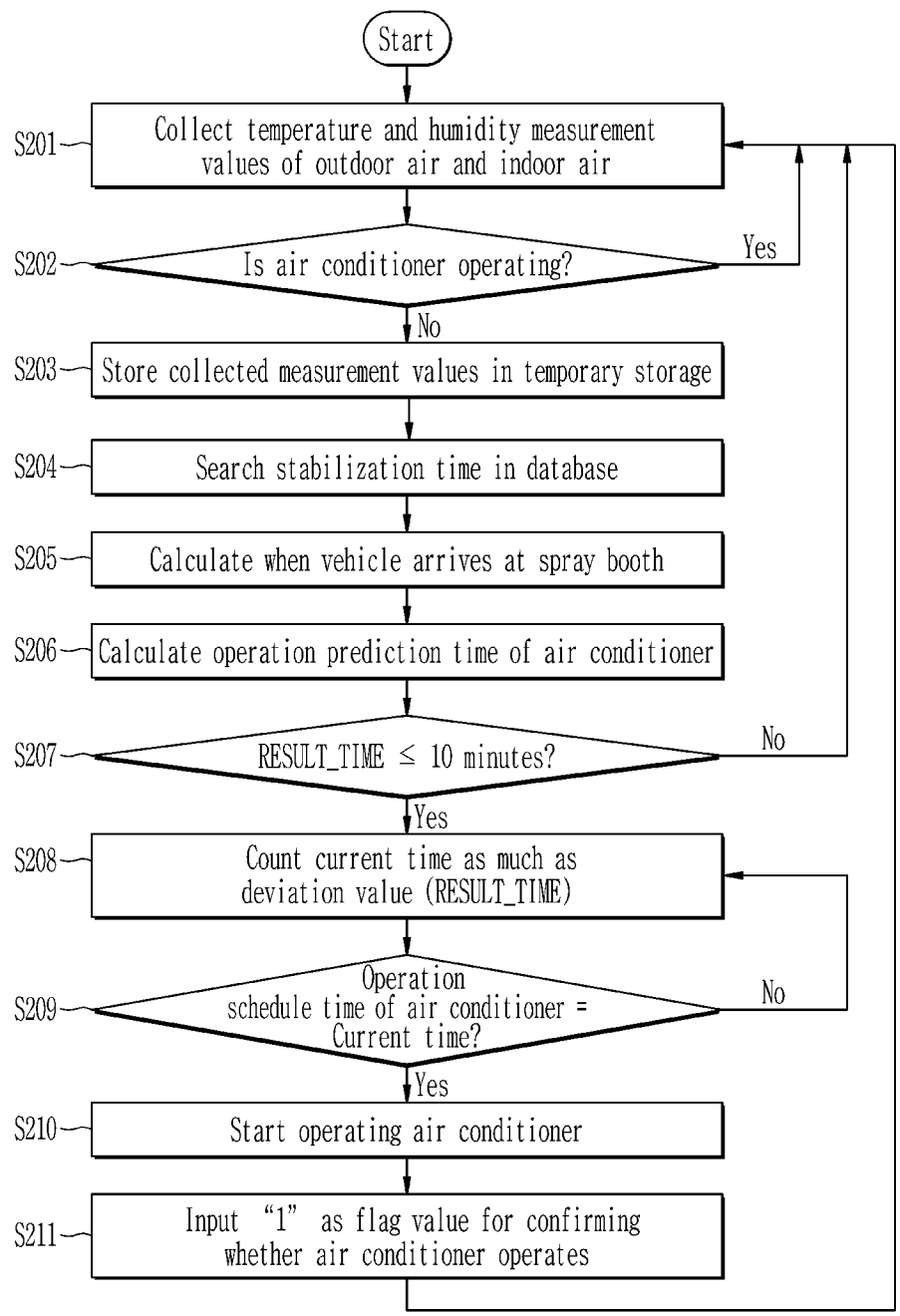

SYSTEM AND METHOD FOR CONTROLLING AIR CONDITIONER

CROSS-REFERENCE TO RELATED APPLICATION

This application claims priority to and the benefit of Korean Patent Application No. 10-2019-0051382 filed on May 2, 2019, the entire contents of which are incorporated herein by reference.

BACKGROUND

(a) Field of the Invention

The present invention relates to an air conditioner control system and method, and more particularly, to a system and a method for controlling an air conditioner that automate an initial operation control for the air conditioner installed in a painting process line for a vehicle.

(b) Description of the Related Art

Generally, an air conditioner installed in a painting process line for a vehicle maintains an internal space of a spray booth in a condition in which temperature and humidity are stabilized at a constant value to form a film of paint on the vehicle or the vehicle body. A conventional air conditioner is manually operated and the internal space of the spray booth is very large. Thus, the air conditioner is operated in advance before the vehicle enters the spray booth to maintain the temperature and humidity in the stabilization condition.

FIG. 1A and FIG. 1B are graphs showing an energy loss problem caused by a conventional air conditioner operation control. Referring to FIGS. 1A and 1B, an initial operation and a stop of the conventional air conditioner depends on the operator's experience causing a deviation in an initial operation time of the air conditioner. The deviation causes energy loss due to accumulation of the unnecessary air conditioner operation time.

Additionally, the time to reach the stabilization conditions of the temperature and the humidity may change due to various reasons such as changes in temperature and humidity of outdoor air, the spray booth size, and heating performance change due to aging of the air conditioner. Accordingly, the operator operates the air conditioner with a margin before the vehicle arrives at the spray booth to maintain the temperature and humidity stabilization conditions of the spray booth. A wait time for adjusting the temperature and the humidity of the spray booth to the temperature and humidity stabilization conditions takes about 40-80 minutes depending on skill of the operator, and energy loss due to accumulation of the wait time occurs.

The above information disclosed in this section is merely for enhancement of understanding of the background of the invention, and therefore it may contain information that does not form the prior art that is already known in this country to a person of ordinary skill in the art.

SUMMARY

The present invention provides a system and a method for controlling an air conditioner that decrease an operation time of the air conditioner installed in a painting process line for a vehicle to reduce energy loss by teaching (e.g., storing) operation information history of the air conditioner in a database and automatically operating the air conditioner at an optimum operation schedule time corresponding to or equal to the operation information history.

An exemplary embodiment of the present invention provides the system for controlling the air conditioner of the painting process line including an air conditioning equipment, a spray booth, and an exhaust equipment that are divided into a plurality of zones, including: an outdoor air measuring device configured to measure temperature and humidity of outdoor air flowing into the air conditioner; an indoor air measuring device configured to measure temperature and humidity inside each of the zones of the spray booth; the air conditioner installed in each of the zones of the air conditioning equipment and configured to supply heated air based on temperature and humidity stabilization conditions required for a painting process of each of the zones of the spray booth; an air conditioning controller configured to transmit operation information of the air conditioner including temperatures and humidifies measured by the outdoor air measuring device and the indoor air measuring device, temperature and humidity stabilization condition values for each of the zones of the spray booth, and an operation state of the air conditioner and to operate the air conditioner when an operation command for the air conditioner is received; and a server configured to extract a stabilization time of the operation information of the air conditioner equal to current operation information of the air conditioner in a database in which the stabilization time required for temperature and humidity of each of the zones of the spray booth to reach the temperature and humidity stabilization condition values is stored and to apply the operation command at an operation schedule time of the air conditioner derived by calculating the stabilization time backward from a time when a vehicle arrives at each of the zones of the spray booth due to operation of a production line of the vehicle.

The air conditioning controller may be configured to detect whether temperature and humidity inside each of the zones of the spray booth reaches the temperature and humidity stabilization conditions and to measure a time taken to reach the temperature and humidity stabilization conditions from an initial operation time of the air conditioner to transmit the measured time to the server. Stabilization temperature of the stabilization conditions may have a predetermined allowable temperature based on the stabilization temperature and stabilization humidity of the stabilization conditions may have a predetermined allowable humidity based on the stabilization humidity.

Further, the server may include: a communicator connected to the air conditioning controller and configured to collect the operation information of the air conditioner; a data manager configured to store the stabilization time in the database based on the operation information of the air conditioner collected from the air conditioning controller; an operation time predictor configured to derive the stabilization time for each of the zones of the spray booth based on the temperature and the humidity of the outdoor air referring to the database and to calculate an operation prediction time of the air conditioner by calculating the stabilization time backward from the arrival time of the vehicle. The database may further be configured to store the stabilization time based on an operation history of the air conditioner and to provide the stabilization time to derive the operation prediction time of the air conditioner. A controller may then be configured to interlock with the air conditioning controller installed in each of zones of the painting process line to monitor operation of the air conditioner and to adjust an operation time of the air conditioner when the production line is operated.

The data manager may be configured to update the database by matching a control value of a burner controller, a washer controller, a reheater controller, a steam controller, or a supply fan controller of the air conditioner with the stabilization time based on the temperature and the humidity of the outdoor air collected at every initial operation time of the air conditioner for each of the zones. The data manager may also be configured to extract a largest value of values including the stabilization time of the air conditioner and store the extracted value in the database.

The operation time predictor may be configured to derive the stabilization time for each of the zones of the spray booth based on the temperature and the humidity of the outdoor air referring to a table of the database. The operation time predictor may be configured to search the stabilization time stored in the database based on the temperature and the humidity of the outdoor air and the stabilization condition values from the air conditioning controller installed in each of the zones and to search a plurality of data of a first candidate data that are equal to the temperature and the humidity value of the outdoor air or have a minimum difference between the first candidate data and the temperature and the humidity of the outdoor air in the data retrieved in the database.

The operation time predictor may be configured to extract, in the first candidate data, a plurality of data of a second candidate data that are equal to the stabilization condition values or have a minimum difference between the second candidate data and the stabilization condition values. Additionally, the operation time predictor may be configured to calculate the operation prediction time of the air conditioner which is calculated backward from the arrival time of the vehicle using a largest number of the plurality of data of the second candidate data. The operation time predictor may be configured to continuously calculate the operation prediction time of the air conditioner to update the calculated operation prediction time in the database until a deviation value that compares the operation prediction time of the air conditioner with a current time is within an allowable time.

Further, the controller may be configured to receive transport information of the vehicle due to operation of the production line from a manufacturing execution system to calculate the time when the vehicle arrives at each of the zones of the spray booth. When a deviation value comparing the operation prediction time of the air conditioner which is continuously updated by the operation time predictor with a current time is within an allowable time, the controller may be configured to fix the operation prediction time of the air conditioner as the operation schedule time of the air conditioner. When the current time reaches the operation schedule time, the controller may be configured to apply the operation command to the air conditioning controller for each of the zones to operate the air conditioner. In addition, the controller may be configured to adjust an initial operation condition of each of controllers included in the air conditioner using a control value of the operation information of the air conditioner matched with the operation schedule time of the air conditioner stored in the database.

An exemplary embodiment of the present invention may provide a method for controlling an operation time of the air conditioner by a server of a system for operating the air conditioner that is disposed in each of zones of the painting process line, including: collecting, by the server, operation information of the air conditioner including temperature and humidity measurement values of outdoor air flowing into the air conditioner, temperature and humidity of indoor air inside each of zones of a spray booth included in the painting process line, temperature and humidity stabilization condition values for each of the zones of the spray booth, and an operation state of the air conditioner from an air conditioning controller for each of the zones of the painting process line to store the collected values in a database; searching, by the server, a stabilization time based on an operation history of the air conditioner of the operation information of the air conditioner equal to current operation information of the air conditioner in the database in which the stabilization time required for temperature and humidity of each of the zones of the spray booth to reach the temperature and humidity stabilization condition values is stored; detecting, by the server, operation of a production line of a vehicle to calculate a time when the vehicle arrives at each of the zones of the spray booth when the production line is operated; and applying, by the server, an operation command for the air conditioner to the air conditioning controller at an operation prediction time of the air conditioner derived by calculating the stabilization time backward from the time when the vehicle arrives at each of the zones of the spray booth.

The applying of the operation command may include: continuously calculating, by the server, the operation prediction time of the air conditioner to update the calculated operation prediction time in the database until a deviation value that compares the operation prediction time of the air conditioner with a current time is within an allowable time. Additionally, the applying of the operation command may include: fixing, by the server, the operation prediction time of the air conditioner as an operation schedule time of the air conditioner when a deviation value comparing the operation prediction time of the air conditioner which is continuously updated with a current time is within an allowable time; and applying, by the server, the operation command to the air conditioning controller of each of the zones to operate the air conditioner when the current time reaches the operation schedule time.

The method for controlling an operation time of the air conditioner may further include: inputting, by the server, "1" that is a flag value for confirming whether the air conditioner is in operation in the database. The method may further include: adjusting, by the server, an initial operation condition of each of controllers included in the air conditioner by extracting a control value of the operation information of the air conditioner matched with the operation prediction time of the air conditioner in the database.

The system and the method for controlling the air conditioner according to the exemplary embodiment of the present invention may reduce the operation time of the air conditioner installed in each of the zones of the painting process line to reduce energy loss by cumulatively storing an initial operation history of the air conditioner in the database and automatically operating the air conditioner at the optimum operation schedule time corresponding to or equal to the initial operation history. Further, the exemplary embodiment of the present invention may use the operation history to monitor abnormality of the air conditioner due to a rapid change of a heat up time (e.g., a stabilization time of the temperature and the humidity) actually measured and optimize setting of the air conditioner.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 5 is a flowchart illustrating a method for deriving an operation prediction time of the air conditioner according to an exemplary embodiment of the present invention;

FIG. 7 is a flowchart illustrating an automatic operation control method for the air conditioner according to an exemplary embodiment of the present invention.

DETAILED DESCRIPTION

Figure 1A:
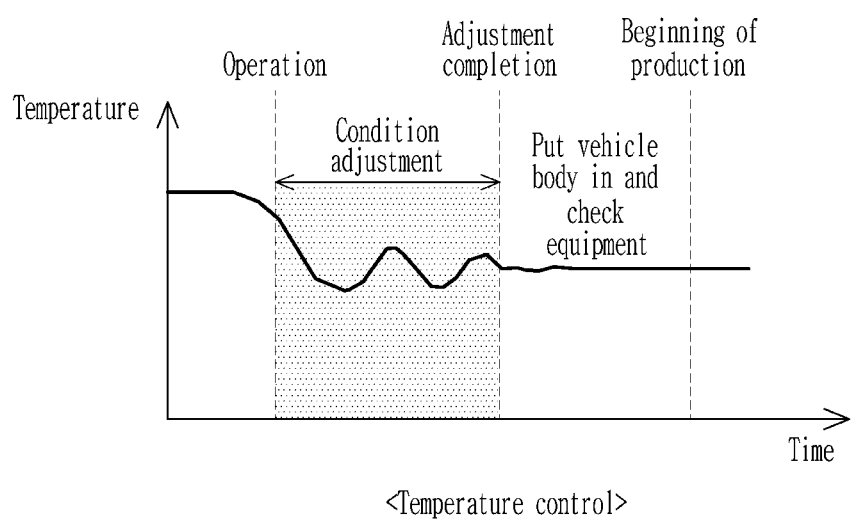
FIG. 1A and FIG. 1B are graphs showing an energy loss problem caused by a conventional air conditioner operation control according to the conventional art.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, terms such as "first", "second", etc. may be used to describe various elements, but the elements should not be limited by the terms. The terms are used only to distinguish one element from another. For example, a first element may be referred as a second element while not going beyond the scope of the rights of the present invention, and in a similar manner, the second element may be referred to as the first element.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Figure 2:
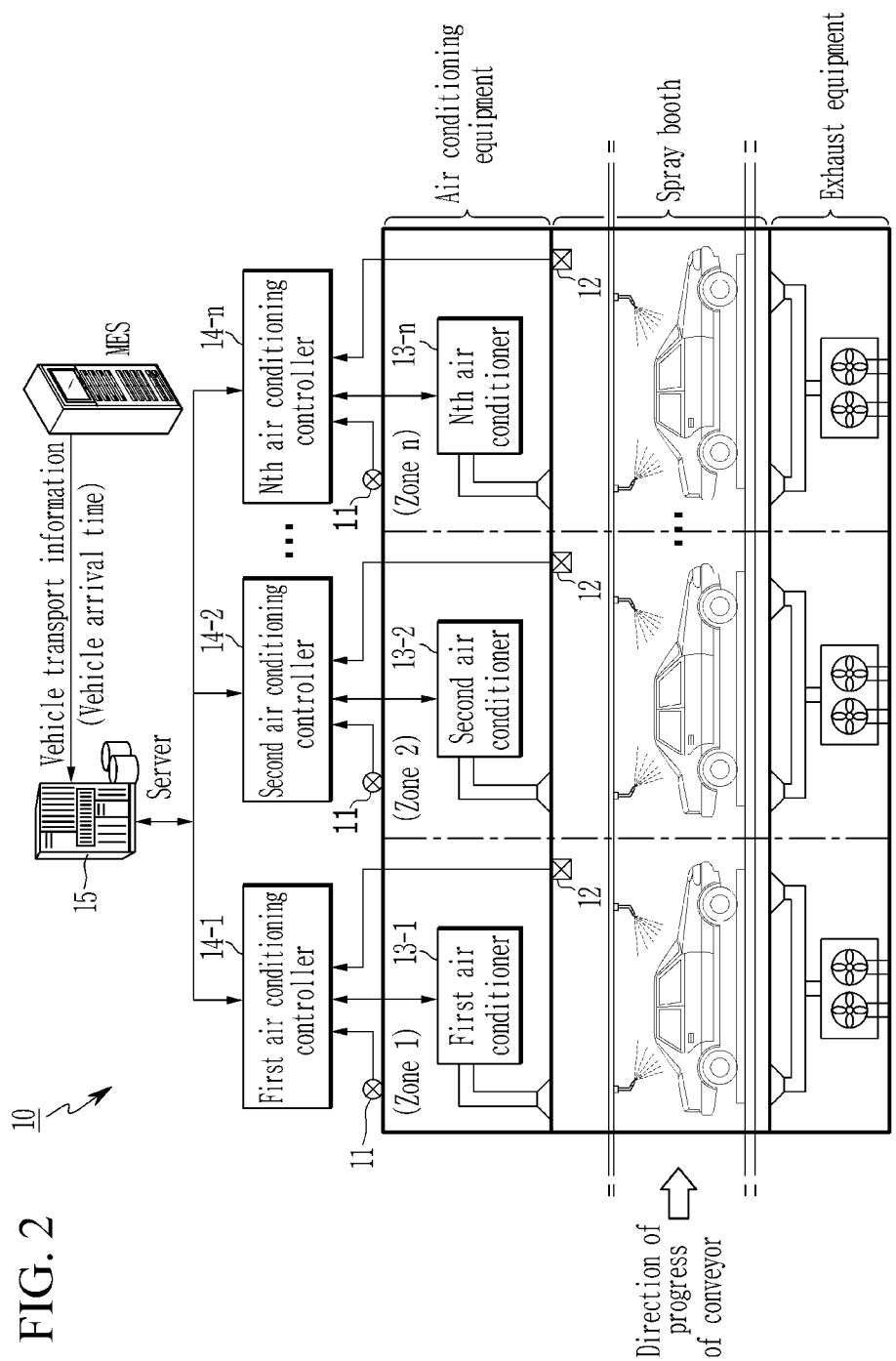
FIG. 2 shows a system for controlling an air conditioner installed in a painting process line for a vehicle according to an exemplary embodiment of the present invention.
Figure 3:
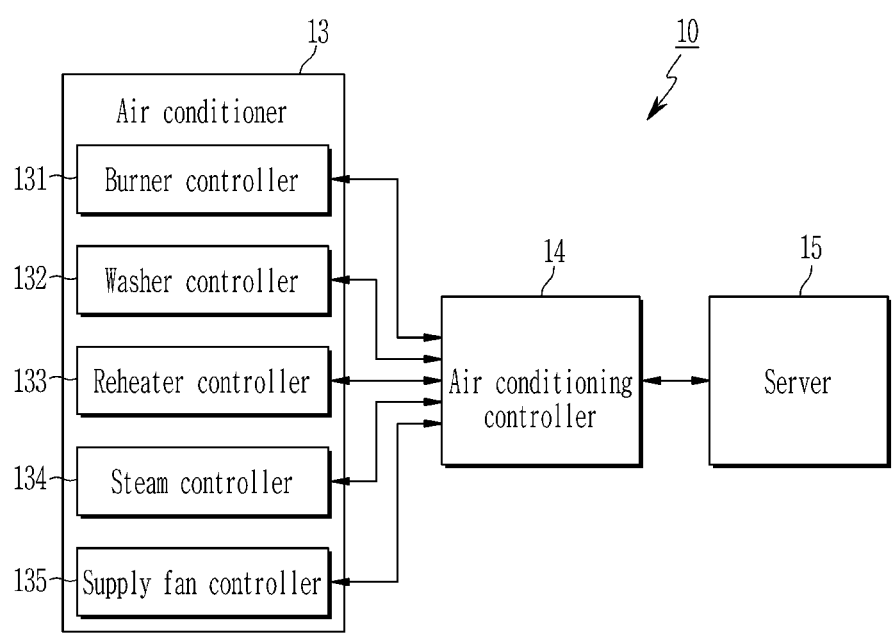
FIG. 3 is a block diagram schematically showing the system for controlling the air conditioner according to an exemplary embodiment of the present invention.

A system and a method for controlling an air conditioner according to an exemplary embodiment of the present invention will now be described in detail with reference to the drawings. FIG. 2 shows the system for controlling or operating the air conditioner installed in a painting process line for a vehicle according to an exemplary embodiment of the present invention. FIG. 3 is a block diagram schematically showing the system for controlling the air conditioner according to an exemplary embodiment of the present invention.

Referring to FIG. 2 and FIG. 3, the painting process line may include an air conditioning equipment, a spray booth, and an exhaust equipment, which are divided into a plurality of zones along a direction of progress of a conveyor. The air conditioning equipment may include a plurality of air conditioners 13-1, 13-2, . . . , 13-n installed in each of the zones and may be configured to supply heated air to an inner space of the spray booth partitioned by each of the zones.

The spray booth may include a paint supply device to perform a painting work to spray paint on the vehicle or the vehicle body transported through the conveyor. The exhaust equipment may include a duct and a fan to exhaust internal air polluted by the painting work to the outside. The system 10 for controlling the air conditioner may include an outdoor air measuring device (or an outdoor air meter) 11, an indoor air measuring device (or an indoor air meter) 12, an air conditioner 13, an air conditioning controller 14, and a server 15 for operating the air conditioner 13 installed in the painting process line. The outdoor air measuring device 11, the indoor air measuring device 12, the air conditioner 13, and the air conditioning controller 14 may be installed for each of the zones.

The system 10 may be configured to maintain an internal space of the spray booth in a condition in which temperature and humidity are stabilized at a constant value that is required for a painting process of the vehicle using an automatic control for an operation time of the air conditioner 13. The outdoor air measuring device 11 may be installed outside the air conditioning equipment and may be configured to measure temperature and humidity of outdoor air flowing into the air conditioner 13. The outdoor air measuring device 11 may be configured to transmit the temperature and the humidity of the outdoor air measured in real time to the air conditioning controller 14 via a communication line.

The indoor air measuring device 12 may be configured to measure temperature and humidity inside the spray booth in real time and transmit the measured temperature and humidity to the air conditioning controller 14 via a communication line. The outdoor air measuring device 11 or the indoor measuring device 12 may include a temperature sensor and a humidity sensor or an integrated sensor which combines a temperature sensor and a humidity sensor and may be installed in each of the zones. The air conditioner 13 may be installed in each of the zones and may be configured to supply air heated according to temperature and humidity conditions required for the painting process of the spray booth.

One air conditioner 13 may be installed for each of the zones of the spray booth in FIG. 2, but an exemplary embodiment of the present invention is not limited thereto. A plurality of air conditioners may be disposed for each of the zones according to size or capacity of the spray booth. An air speed and an operation condition of the air conditioner may be set differently based on the size or the capacity of the spray booth. The air conditioner 13 may include controllers (or control modules) configured to operate a burner, a washer, a reheater, a steamer, and a supply fan to supply heated air into the spray booth.

In other words, as shown in FIG. 3, the air conditioner 13 may include a burner controller 131, a washer controller 132, a reheater controller 133, a steam controller (or a steamer controller) 134, and a supply fan controller 135. Each of the controllers 131-135 may be operated according to a predetermined value using a proportional-integral-derivative (PID) controller, and operation information of each of the controllers may be transmitted to the air conditioning controller 14 via a communication line.

Figure 1B:
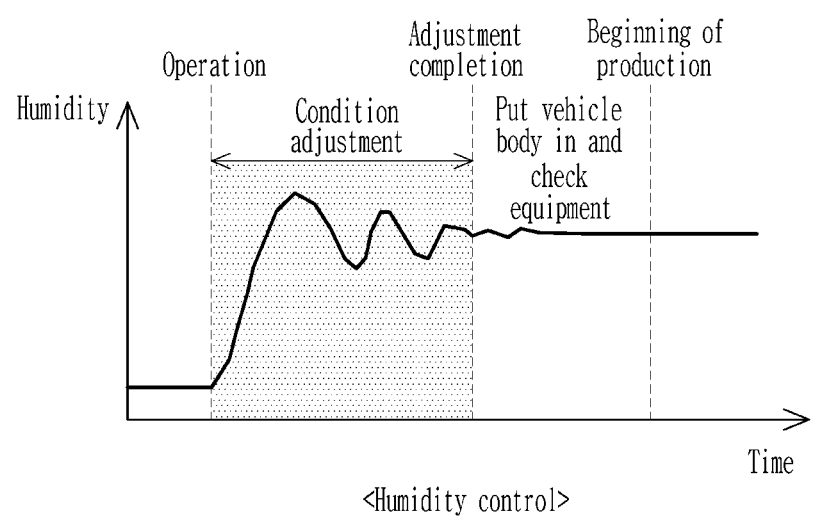

Each of the controllers 131-135 may be operated based on the temperature and the humidity of the outdoor air and the temperature and humidity stabilization condition values required for the painting process of each of the zones of the spray booth so that each of the controllers generates a manipulated variable (MV) that is a control value and the controller 132 may be configured to adjust an opening rate of a washer pump of the air conditioner. Since various control modules are operated simultaneously when an air conditioner is operated in a conventional art, an initial operation control adjustment time takes excessively long in a severe condition where temperature of outdoor air of the air conditioner is low or humidity of the outdoor air is high, as shown in FIG. 1A and FIG. 1B.

The air conditioning controller 14 may be installed for each zone and may be configured to adjust an operation state of the air conditioner 13 in line with the server 15. In particular, the air conditioning controller 14 may be configured to receive temperature and humidity of the outdoor air measured at the outdoor air measuring device 11 and transmit temperature and humidity of the outdoor air measured at an initial operation time of the air conditioner 13 to the server 15. The air conditioning controller 14 may also be configured to detect whether temperature and humidity inside the spray booth received from the indoor measuring device 12 reaches the temperature and humidity stabilization conditions for the painting work. The air conditioning controller 14 may be configured to measure a time taken to reach the temperature and humidity stabilization conditions from the initial operation time to transmit the measured time to the server 15.

Stabilization temperature of the stabilization conditions may have a predetermined allowable temperature or a permissible width $\pm\alpha°$ C. based on the stabilization temperature and stabilization humidity of the stabilization conditions may have a predetermined allowable ratio (e.g., a predetermined allowable humidity) or a permissible width $\pm\beta\%$ based on the stabilization humidity. For example, the permissible width of the stabilization temperature may be $\pm1°$ C. and the permissible width of the stabilization humidity may be $\pm1°$ C. However, the present invention is not limited thereto, and the permissible width may vary based on the size or the capacity of the spray booth.

The server 15, which is a central processing system for operating the painting process line, may be configured to collect operation information of the air conditioner 13 through the air conditioning controller 14 installed in each zone to accumulate the operation information in a database 154, and may be configured to automatically control an initial operation time of the air conditioner 13 based on the operation information. In particular, the server 15 may be configured to extract stabilization time that corresponds to or is equal to current operation information of the air conditioner in the database in which a time required to stabilize temperature and humidity in each of the zones of the spray booth is stored or learned. The server 15 may be configured to apply an operation command for the air conditioner to the air conditioning controller at an operation schedule time of the air conditioner derived by counting or calculating the stabilization time backward based on an arrival time of the vehicle for each of the zones of the spray booth due to operation of a production line of the vehicle.

Figure 4:
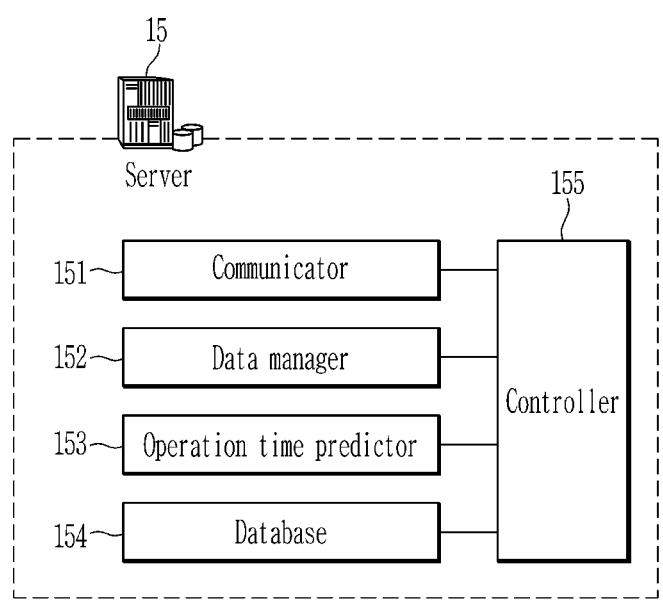
FIG. 4 shows configuration of a server according to an exemplary embodiment of the present invention.

FIG. 4 shows configuration of the server according to an exemplary embodiment of the present invention. Referring to FIG. 4, the server 15 may include a communicator 151, a data manager 152, an operation time predictor 153, the database (DB) 154, and a controller 155.

The communicator 151 may include a wired and wireless interface for connection with an external device and may be connected to the air conditioning controller 14 of each zone of the painting process line to collect operation information of the air conditioner 13 in real time. Additionally, the communicator 151 may be connected to a manufacturing execution system (MES) via a network in a factory with the painting process line to receive transport information of the vehicle due to operation of the production line of the factory.

The data manager 152 may be configured to learn the stabilization time of the temperature and the humidity for each zone actually measured based on operation information of the air conditioner collected from each of the air conditioning controllers 14-1-14-n to cumulatively store the learned time in the database 154. The operation information of the air conditioner may include an operation state (e.g., an on state or an off state) of the air conditioner for each zone, temperature and humidity values of outdoor air of the air conditioner collected at an initial operation of the air conditioner, the temperature and humidity stabilization condition values, the control value of each controller of the air conditioner, and the stabilization time required for the temperature and humidity of each of the zones of the spray booth to reach the temperature and humidity stabilization condition values.

The data manager 152 may further be configured to update the database 154 by matching the control value of each of the controllers 131-135 of the air conditioner 13 with the stabilization time. Each of the controllers 131-135 may be configured to generate the control value that generates the stabilization condition values based on the temperature and humidity values of the outdoor air collected at every initial operation time of the air conditioner 13 for each zone. The data manager 152 may be configured to extract a largest value in the stabilization times of the air conditioners 13 to store the extracted value in a table of the database 154.

The operation time predictor 153 may be configured to derive the stabilization time for each of the zones of the spray booth based on the temperature and humidity values of the outdoor air referring to the table. In addition, the operation time predictor 153 may be configured to continuously calculate an operation prediction time of the air conditioner 13 by calculating the stabilization time backward from a time when the vehicle arrives at the painting process line due to operation of the production line of the factory.

FIG. 5 is a flowchart illustrating a method for deriving the operation prediction time of the air conditioner according to an exemplary embodiment of the present invention. FIG. 5 shows a process in which the operation time predictor 153 calculates the stabilization time for automatic operation of the air conditioner 13 supplying air to the spray booth when the production line of the factory is operated.

The operation time predictor 153 may be configured to read the temperature and humidity values of the outdoor air currently measured and the stabilization condition values from the air conditioning controller 14 installed in each of the zones (step S101). The operation time predictor 153 may also be configured to search the stabilization time stored in the database 154 based on the read values (step S102). The operation time predictor 153 may be configured to search ten data of a first candidate data that are equal to the temperature and humidity values of the outdoor air currently measured or have a minimum difference between the first candidate data and the temperature and humidity values of the outdoor air in the data retrieved in the database 154 (step S103). The number of the first candidate data may be assumed to be 10, but the number thereof is not limited to this and may be changed.

The process may then return to the step S101 and may be repeated until the search for all the zones is completed when the search for the first candidate data for each zone of the spray booth is not completed (No in step S104). When the search for the first candidate data for each zone of the spray booth is completed (Yes in the step S104), the operation time predictor 153 may be configured to extract in the first candidate data three data of a second candidate data that are equal to the stabilization condition values or have a minimum difference between the second candidate data and the stabilization condition values (step S105). The number of the second candidate data may be assumed to be three, but the number of the candidate data is not limited thereto and may be changed.

Additionally, the operation time predictor 153 may be configured to calculate an average value of the extracted three stabilization times (step S106). The operation time predictor 153 may be configured to calculate the operation prediction time of the air conditioner 13 which is calculated backward from the time when the vehicle arrives at the painting process line using the greatest number of the three stabilization times (step S107). The operation time predictor 153 may also be configured to continuously calculate the operation prediction time of the air conditioner to update the calculated operation prediction time in the database 154 until a deviation value RESULT_TIME that compares the operation prediction time of the air conditioner with a current time is within an allowable time (e.g., about 10 minutes). The deviation value may be a difference value between the operation prediction time and the current time.

Since the operation prediction time of the air conditioner 13 is varied based on the temperature and humidity values of the outdoor air, the operation time predictor 153 may be configured to continuously calculate the operation prediction time of the air conditioner to update the calculated operation prediction time in the database until the deviation value is within the allowable time to calculate more accurate operation prediction time of the air conditioner corresponding to (e.g., or close to) the current time.

The database 154 may be configured to store various programs and data for control of each air conditioner 13 installed in the painting process line and store data generated according to operation of the air conditioner 13. The database 154 may be configured to cumulatively store the actually measured stabilization time based on operation history of each air conditioner 13 in a table of the database and provide the stabilization time to derive an automatic operation time of the air conditioner.

In addition, the database 154 may be configured to store the operation history, operation schedule, operation state information, and processing result information of the air conditioner 13 for each zone. The controller 155 may include at least one processor configured to store a program and data controlling components of the server 15 to operate the air conditioner and use the program and the data. The controller 155 may interlock or communicate with the air conditioning controller 14 installed in each zone of the painting process line via the factory network to monitor operation of the air conditioner 13 and to adjust an operation time of the air conditioner when the production line is operated.

Particularly, the controller 155 may be configured to detect operation of the production line via the factory network to adjust automatic operation of the air conditioner for 24 hours without operator intervention and may be configured to calculate a time when the vehicle arrives at an entrance of the spray booth when the production line is operated. The controller 155 may also be configured to receive the vehicle transport information due to operation of the production line of the factory from the MES to calculate a time when the vehicle at the very front of the conveyor arrives at the entrance of the spray booth. For example, the controller 155 may be configured to calculate the arrival time of the vehicle based on the vehicle position on the conveyor, the conveyor moving speed, and a work time of a preceding process.

The controller 155 may also be configured to determine whether the deviation value RESULT_TIME comparing the operation prediction time of the air conditioner which is continuously updated by the operation time predictor 153 with the current time is within the allowable time (e.g., about 10 minutes). The controller 155 may then be configured to fix the operation prediction time of the air conditioner calculated when the deviation value RESULT_TIME is within the allowable time as the operation schedule time of the air conditioner. When the current time reaches the operation schedule time, the controller 155 may be configured to automatically apply the operation command to the air conditioning controller 14 of each zone to start operation of the air conditioner 13. At this time, the controller 155 may be configured to read operation information of the air conditioner matched with the operation schedule time of the air conditioner in the database 154 and use the information as information for initial operation of the air conditioner 13.

Figure 6A:
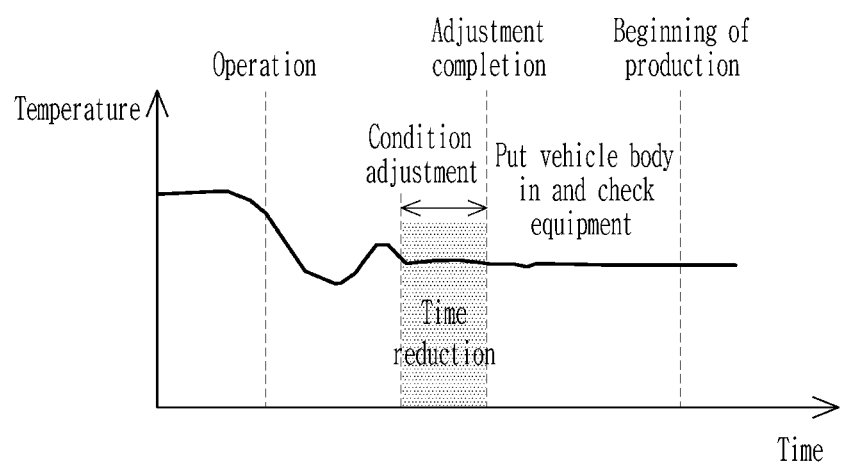
FIG. 6A and FIG. 6B are graphs showing a result of reduced temperature and humidity control times when the air conditioner is operated according to an exemplary embodiment of the present invention.
Figure 6B:
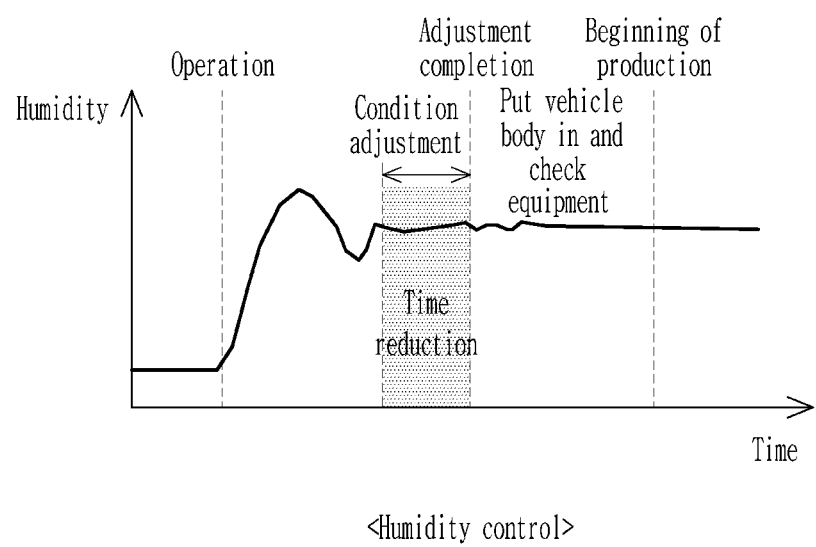

FIG. 6A and FIG. 6B are graphs showing a result of reduced temperature and humidity control times when the air conditioner is operated according to an exemplary embodiment of the present invention. Referring to FIGS. 6A and 6B, the controller 155 may be configured to automatically adjust an initial operating condition of the air conditioner using the learned control value equal to a current operating condition of the air conditioner to shorten an adjustment time until the temperature and humidity of the spray booth reaches the stabilized temperature and humidity values.

The controller 155 may be configured to monitor whether temperature and humidity inside the spray booth reaches the stabilization condition values and learn the stabilization time to update the learned values in the database 154 when the temperature and humidity inside the spray booth reaches the stabilization condition values. The controller 155 may then be configured to update the learned information as latest information in the database 154 when the same information as the learned information exists in the database and may be configured to add or store the learned information as new data in the database 154 when the same information as the learned information does not exist in the database.

The controller 155 may then be configured to stop operation of the air conditioner 13 by applying a stop command to the air conditioning controller 14 when a production end signal according to stop of the production line of the factory is received from the MES. At this time, the controller 155 may be configured to collect information such as an operation date, an operation day, an operation time, and processing result of the air conditioner 13 from the air conditioning controller 14 to store the collected information in the database 154.

Additionally, the controller 155 may be configured to provide through a user interface (UI) various information such as a main screen for automatic operation setting of the air conditioner for each zone, a voice alarm system setting screen, an environment setting and production plan registration screen, or an air conditioner operation history inquiry screen based on information or data stored in the database 154. For example, the main screen may display a operation time of the air conditioner in advance based on the stabilization time stored in the database and a process operation condition before and after stop of the air conditioner due to a holiday of the factory, may be configured to generate an alarm in a message window when abnormality of the air conditioner occurs, and may include a switch key for switching between an automatic operation mode and a manual operation mode.

The controller 155 may be configured to monitor an operation state of the air conditioner 13 to set an announcement according to detection of an operation signal or an abnormal signal of the air conditioner and switch the set announcement to a voice. The voice alarm system setting screen may broadcast the voice. The voice alarm system may be a foolproof system that allows the operator to recognize operation of the air conditioner. The environment setting and production plan registration screen may be accessible only to an authorized person registered in advance and may provide a menu for a characteristic input for the factory or for registration of a strike and an overtime schedule generated per year or irregularly to reflect various environmental conditions. The operation history inquiry screen of the air conditioner may provide an operation history inquiry function of the air conditioner for each zone and an operation value inquiry function of the air conditioning controller.

An automatic operation control method of the air conditioner according to an exemplary embodiment of the present invention based on configuration of the air conditioner control system 10 described above is shown in FIG. 7. Since elements of the server 15 described above may be further subdivided into functions or integrated into one system, the server 15 may be described as the subject or a main agent of each step of FIG. 7.

FIG. 7 is a flowchart illustrating an automatic operation control method of an air conditioner according to an exemplary embodiment of the present invention. Referring to FIG. 7, the server 15 may be configured to collect temperature and humidity measurement values of the outdoor air and the indoor air currently measured from the air conditioning controller 14 for automatic operation control for 24 hours for the air conditioner 13 and may be configured to store the collected values in the database 154 (step S201).

The server 15 may be configured to check an operation state of the air conditioner 13 and continuously update the database 154 with the collected values when the air conditioner 13 is operating (Yes in step S202). The server 15 may also be configured to store the collected temperature and humidity measure values of the outdoor air and the indoor air in a temporary storage (e.g., the database 154) (step S203) when the air conditioner 13 is not in operation (No in the step S202). The server 15 may be configured to read the temperature and humidity values of the outdoor air currently measured and the stabilization condition values from the database 154 and search the stabilization time in data stored in the database 154 based on the read values (step S204). At this time, the server 15 may be configured to derive or calculate the stabilization time of the air conditioner 13 through the process of FIG. 5 using the operation time predictor 153.

The server 15 may be configured to detect the operation of the production line to calculate the time when the vehicle arrives at the entrance of the spray booth when the production line is operated (step S205). The server 15 may be configured to compute the operation prediction time of the air conditioner 13 by calculating the stabilization time backward from the arrival time of the vehicle (step S206). At this time, the server 15 may be configured to calculate the operation prediction time of the air conditioner 13 which is calculated backward from the arrival time of the vehicle using the greatest number of the stabilization times of the zones. The server 15 may be configured to determine whether the deviation value RESULT_TIME that compares the operation prediction time of the air conditioner with the current time is less than or equal to the allowable time (e.g., about 10 minutes) (step S207).

When the deviation value RESULT_TIME exceeds the allowable time (No in the step S207), the server 15 may ignore the operation prediction time of the air conditioner and may return to the step S201 to recalculate an operation predicted time of the air conditioner based on a measured value that is collected next. When the deviation value RESULT_TIME is within the allowable time (Yes in the step S207), the server 15 may be configured to fix the operation prediction time of the air conditioner as the operation schedule time of the air conditioner and count the current time by the deviation value RESULT_TIME (step S208).

When the operation schedule time of the air conditioner becomes equal to the current time (Yes in step S209), the server 15 may be configured to operate the air conditioner 13 by applying an operation command to the air conditioning controller 14 (step S210). The server 15 may input "1" that is a flag value for confirming whether the air conditioner is in operation in the database 154 so that the server checks an operation state of the air conditioner (step S211).

The exemplary embodiment of the present invention may decrease the operation time of the air conditioner installed in each of the zones of the painting process line for the vehicle to reduce energy loss by cumulatively storing an initial operation history of the air conditioner in the database and automatically operating the air conditioner at the optimum operation schedule time corresponding to the initial operation history. In addition, the exemplary embodiment of the present invention may use the operation history to monitor abnormality of the air conditioner due to a rapid change of a heatup time (e.g., the stabilization time of the temperature and the humidity) actually measured and optimize setting of the air conditioner.

The exemplary embodiment of the present invention is not implemented only by the aforementioned apparatus and/or method, and may be implemented by a program for operating a function corresponding to the configuration of the exemplary embodiment of the present invention, a recording medium in which the program is recorded, and the like, and the implementation may be easily realized from the description of the aforementioned exemplary embodiment by those skilled in the art.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

10: air conditioner control system
11: outdoor air measuring device
12: indoor air measuring device
13: air conditioner
14: air conditioning controller
15: server
151: communicator
152: data manager
153: operation time predictor
154: database (DB)
155: controller

What is claimed is:

1. A system for controlling an air conditioner of a painting process line including an air conditioning equipment, a spray booth, and an exhaust equipment that are divided into a plurality of zones, comprising:
an outdoor air measuring device configured to measure temperature and humidity of outdoor air flowing into the air conditioner;
an indoor air measuring device configured to measure temperature and humidity inside each of the zones of the spray booth;
the air conditioner installed in each of the zones of the air conditioning equipment and configured to supply heated air based on temperature and humidity stabilization conditions required for a painting process of each of the zones of the spray booth;
an air conditioning controller configured to transmit operation information of the air conditioner including temperatures and humidities measured by the outdoor air measuring device and the indoor air measuring device, temperature and humidity stabilization condition values for each of the zones of the spray booth, and an operation state of the air conditioner and to operate the air conditioner when an operation command for the air conditioner is received; and
a server configured to extract a stabilization time of the operation information of the air conditioner equal to current operation information of the air conditioner in a database in which the stabilization time required for temperature and humidity of each of the zones of the spray booth to reach the temperature and humidity stabilization condition values is stored and configured to apply the operation command at an operation schedule time of the air conditioner derived by calculating the stabilization time backward from a time when a vehicle arrives at each of the zones of the spray booth due to operation of a production line of the vehicle,
wherein the server includes,
a communicator connected to the air conditioning controller and configured to collect the operation information of the air conditioner;
a data manager configured to store the stabilization time in the database based on the operation information of the air conditioner collected from the air conditioning controller;
an operation time predictor configured to derive the stabilization time for each of the zones of the spray booth based on the temperature and the humidity of the outdoor air referring to the database and to calculate an operation prediction time of the air conditioner by calculating the stabilization time backward from the arrival time of the vehicle;
the database configured to store the stabilization time based on an operation history of the air conditioner and to provide the stabilization time to derive the operation prediction time of the air conditioner, and
a controller configured to communicate with the air conditioning controller installed in each of the zones of the painting process line to monitor operation of the air conditioner and to adjust an operation time of the air conditioner when the production line is operated.

2. The system of claim 1, wherein the air conditioning controller is configured to check whether temperature and humidity inside each of the zones of the spray booth reaches the temperature and humidity stabilization conditions and to measure a time taken to reach the temperature and humidity stabilization conditions from an initial operation time of the air conditioner to transmit the measured time to the server.

3. The system of claim 2, wherein stabilization temperature of the stabilization conditions has a predetermined allowable temperature based on the stabilization temperature and stabilization humidity of the stabilization conditions has a predetermined allowable humidity based on the stabilization humidity.

4. The system of claim 1, wherein the data manager is configured to update the database by matching a control value of a burner controller, a washer controller, a reheater controller, a steam controller, or a supply fan controller of the air conditioner with the stabilization time based on the temperature and the humidity of the outdoor air collected at every initial operation time of the air conditioner for each of the zones.

5. The system of claim 4, wherein the data manager is configured to extract a largest value in values including the stabilization time of the air conditioner to store the extracted value in the database.

6. The system of claim 4, wherein the operation time predictor is configured to derive the stabilization time for each of the zones of the spray booth based on the temperature and the humidity of the outdoor air referring to a table of the database.

7. The system of claim 1, wherein the operation time predictor is configured to search the stabilization time stored in the database based on the temperature and the humidity of the outdoor air and the stabilization condition values from the air conditioning controller installed in each of the zones and configured to search a plurality of data of a first candidate data that are equal to the temperature and the humidity value of the outdoor air or have a minimum difference between the first candidate data and the temperature and the humidity of the outdoor air in the data retrieved in the database.

8. The system of claim 7, wherein the operation time predictor is configured to extract, in the first candidate data, a plurality of data of a second candidate data that are equal to the stabilization condition values or have a minimum difference between the second candidate data and the stabilization condition values.

9. The system of claim 8, wherein the operation time predictor is configured to calculate the operation prediction time of the air conditioner which is calculated backward from the arrival time of the vehicle using a largest number of the plurality of data of the second candidate data.

10. The system of claim 9, wherein the operation time predictor is configured to continuously calculate the operation prediction time of the air conditioner to update the calculated operation prediction time in the database until a deviation value that compares the operation prediction time of the air conditioner with a current time is within an allowable time.

11. The system of claim 1, wherein the controller is configured to receive transport information of the vehicle due to operation of the production line from a manufacturing execution system to calculate the time when the vehicle arrives at each of the zones of the spray booth.

12. The system of claim 11, wherein when a deviation value comparing the operation prediction time of the air conditioner which is continuously updated by the operation time predictor with a current time is within an allowable time, the controller is configured to fix the operation prediction time of the air conditioner as the operation schedule time of the air conditioner.

13. The system of claim 12, wherein when the current time reaches the operation schedule time, the controller is configured to apply the operation command to the air conditioning controller for each of the zones to operate the air conditioner.

14. The system of claim 13, wherein the controller is configured to adjust an initial operation condition of each of controllers included in the air conditioner using a control value of the operation information of the air conditioner matched with the operation schedule time of the air conditioner stored in the database.

15. A method for controlling an operation time of an air conditioner by a server of a system for controlling the air conditioner that is disposed in each of zones of a painting process line, comprising:
    collecting, by the server, operation information of the air conditioner including temperature and humidity measurement values of outdoor air flowing into the air conditioner, temperature and humidity of indoor air inside each of zones of a spray booth included in the painting process line, temperature and humidity stabilization condition values for each of the zones of the spray booth, and an operation state of the air conditioner from an air conditioning controller for each of the zones of the painting process line to store the collected values in a database;
    searching, by the server, a stabilization time based on an operation history of the air conditioner of the operation information of the air conditioner equal to current operation information of the air conditioner in the database in which the stabilization time required for temperature and humidity of each of the zones of the spray booth to reach the temperature and humidity stabilization condition values is stored;
    detecting, by the server, operation of a production line of a vehicle to calculate a time when the vehicle arrives at each of the zones of the spray booth when the production line is operated; and
    applying, by the server, an operation command for the air conditioner to the air conditioning controller at an operation prediction time of the air conditioner derived by calculating the stabilization time backward from the time when the vehicle arrives at each of the zones of the spray booth,
    wherein applying the operation command includes continuously calculating, by the server, the operation prediction time of the air conditioner to update the calculated operation prediction time in the database until a deviation value that compares the operation prediction time of the air conditioner with a current time is within all allowable time.

16. The method of claim 15, wherein applying the operation command includes:
    fixing, by the server, the operation prediction time of the air conditioner as an operation schedule time of the air conditioner when a deviation value comparing the operation prediction time of the air conditioner which is continuously updated with a current time is within an allowable time; and
    applying, by the server, the operation command to the air conditioning controller of each of the zones to operate the air conditioner when the current time reaches the operation schedule time.

17. The method of claim 15, further comprising:
    inputting, by the server, "1" that is a flag value for confirming whether the air conditioner is in operation in the database.

18. The method of claim 15, further comprising:
    adjusting, by the server, an initial operation condition of each of controllers included in the air conditioner by extracting a control value of the operation information of the air conditioner matched with the operation prediction time of the air conditioner in the database.

* * * * *